United States Patent [19]
Sadjadpour

[11] Patent Number: 6,026,121
[45] Date of Patent: Feb. 15, 2000

[54] ADAPTIVE PER-SURVIVOR PROCESSOR

[75] Inventor: Hamid R. Sadjadpour, Randolph, N.J.

[73] Assignee: AT&T Corp, New York, N.Y.

[21] Appl. No.: 08/900,801

[22] Filed: Jul. 25, 1997

[51] Int. Cl.[7] .................................................. H04L 23/02
[52] U.S. Cl. ........................ 375/262; 375/34.1; 371/43.7
[58] Field of Search .................................... 375/262, 265, 375/340, 341, 346, 348, 349; 371/43.1, 43.4, 43.6, 43.7

[56] References Cited

U.S. PATENT DOCUMENTS

| | | | |
|---|---|---|---|
| 5,014,275 | 5/1991 | Shimoda et al. | 371/43 |
| 5,202,903 | 4/1993 | Okanoue | 375/340 |
| 5,353,307 | 10/1994 | Lester et al. | 375/341 |
| 5,432,821 | 7/1995 | Polydoros et al. | 375/340 |
| 5,619,167 | 4/1997 | Adachi | 329/304 |
| 5,734,598 | 3/1998 | Abbott et al. | 364/724.19 |
| 5,781,569 | 7/1998 | Fossorier et al. | 371/43.7 |
| 5,818,876 | 10/1998 | Love | 375/341 |
| 5,905,743 | 5/1999 | Ramesh | 371/43.7 |

OTHER PUBLICATIONS

Asilomar 1996, Technical Paper: "Pseudo–Maximum Likelihood Data Estimation of Digital Sequences in the Presence of Intersymbol Interference", Authors: H.R. Sadjadpour & C.L. Weber, pp. 1–4.

Asilomar 1994, Technical Paper: "Simplified Pseudo–maximum Likelihood Data Estimation Algorithm", Authors: H.R. Sadjadpour & C.L. Weber; pp. 1–5.

Thesis:/University of Southern Calif.: "Blind Equalization Techniques Using Meximum Likelihood Criterion", Author: H.L. Sadjapour, Jan. 1996, (113 pages=cover page–xi; pp. 1–102.

Sadjapour,Hamid R. and Weber, Charles L. Simplified Pseudo–Maximum Likelihood Data Estimation Algorithm. *Asilomar* 94.

Sadjadpour, Hamid R. And Weber, Charles L. Pseudo–Maximum Likelihood Data Estimation of Digital Sequences in the Presence of Intersymbol Interference. *Asilomar* 96.

*Primary Examiner*—Chi H. Pham
*Assistant Examiner*—Emmanuel Bayard

[57] ABSTRACT

A system and method for recovering transmitted modulated digital data symbols in a wireless communications system having inter symbol interference which decodes the signal using a Viterbi or sub-optimal decoder which has a variable step size or weighting factor for a plurality of survivor paths.

28 Claims, 1 Drawing Sheet

ADAPTIVE PER-SURVIVOR PROCESSOR

FIELD OF THE INVENTION

This invention relates to the use of an adaptive step-size factor for use in facilitating communications for mobile transceivers (e.g., car based cellular phones) with a variable channel impulse response, and more particularly, to an adaptive per-survivor system for use with a maximum likelihood sequence estimation (MLSE) based receiver.

BACKGROUND OF THE INVENTION

Current state of the art cellular phone technologies have a difficult time operating in a mobile environment where one of the phones is located in a moving car. As the car moves between buildings or under bridges, the communication often breaks up or has periods of extreme noise. In part, the difficulty in maintaining clear communications results from the fact that the characteristics of the communication channel between the cellular phone and the receiving station change very rapidly as, for example, when the car passes under a bridge. In general, although numerous attempts have been made to accommodate mobile transceivers, current radio transceivers deal with highly dynamic channel conditions relatively poorly.

In current wireless communications systems, a major source of channel degradation is Inter-symbol Interference (ISI). Conventionally, many different types of equalizers are utilized to try to prevent ISI. One group of equalizers are based on the Viterbi Algorithm (VA). VA approaches utilize a method to estimate the channel impulse response. Per-Survivor Processing (PSP) is a new technique to apply channel estimation to all the survivor paths. Although this approach has improved the overall system performance in uncertain environments, it still does not satisfactorily eliminate the dependency between different paths and thus can still be problematic where the channel characteristics change very rapidly.

SUMMARY OF THE INVENTION

The present invention greatly improves current communication systems by employing a receiver which operates to decode modulated digital data symbols received from a wireless communication system with inter symbol interference using an optimal or sub-optimal Viterbi receiver with a variable step size factor for a plurality of survivor paths. Although the complexity of the receiver is increased to some extent, the overall system performance with the use of a dynamic step-size factor is greatly improved. This improved performance results, at least in part, from a further elimination of the dependency between different paths.

The inclusion of the variable step size or weighting factor provides a new adaptive per-survivor processing based receiver system and method which helps to greatly decrease the effect of Inter-symbol Interference in mobile wireless systems. This new receiver and method helps eliminate the dependency of all the survivor paths and helps to achieve an independent parameter estimation in maximum likelihood sequence estimation (MLSE) based receiver designs. By utilizing features of the present invention, parameter estimation for each path can be carried out independently for all the survivor paths. Accordingly, substantial overall system performance improvements can be made.

These and other features of the invention will be apparent upon consideration of the following detailed description of preferred embodiments. Although the invention has been defined using the appended claims, these claims are exemplary in that the invention is meant to include the elements and steps described herein in any combination or subcombination. Accordingly, there are any number of alternative combinations for defining the invention, which incorporate one or more elements from the existing claims or from the specification, including the drawings, in various combinations or subcombinations. It will be apparent to those skilled in the art of mobile transceiver theory and design, in light of the present specification, that alternate combinations which include a dynamic step-size or weighting factor may be utilized to achieve the advantageous results outlined herein. It is intended that the written description contained herein cover all such modifications and alterations.

DETAILED DESCRIPTION OF PREFERRED EMBODIMENTS

Figure 1:
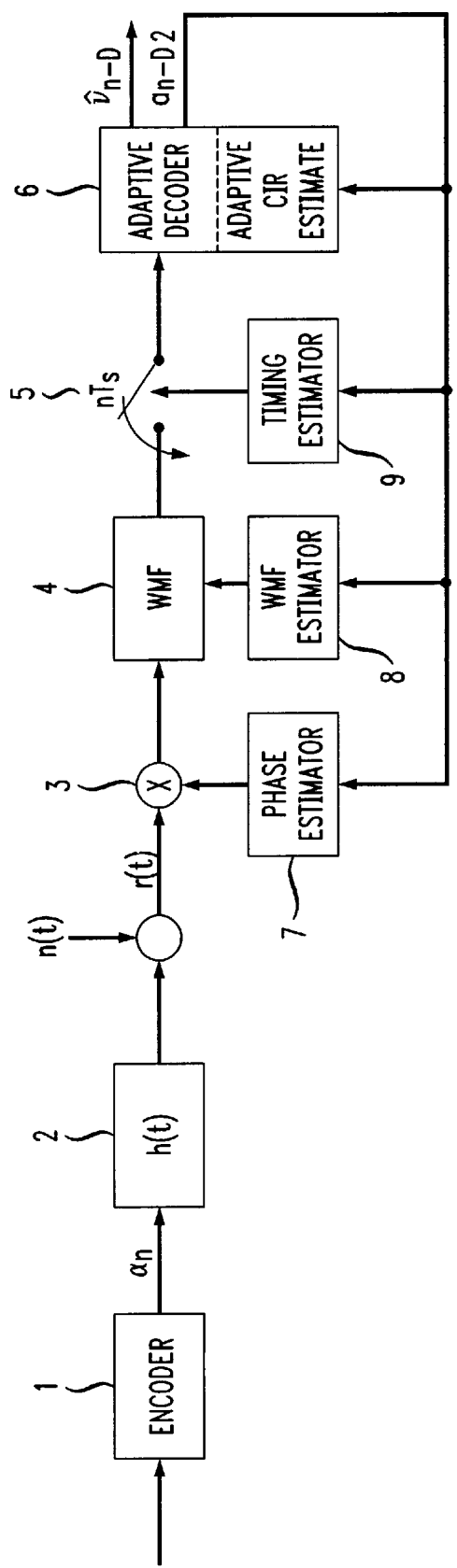
FIG. 1 shows a block diagram on one exemplary embodiment of a communication receiver having an adaptive step-size factor.

The Viterbi algorithm or its sub-optimal algorithms that utilizes Per-Survivor Processing (PSP) technique typically requires a mechanism to choose the best channel estimation for each of the different paths. The Viterbi algorithm, based on PSP, performs a full trellis search for all different paths with each search using only one channel impulse response estimation. However, in time-varying environments like wireless systems, the use of only one channel estimation is problematic in that the channel generally has a substantial amount of time varying noise. In mobile environments, the system experiences wide variations in the channel impulse response as the transceiver moves under bridges and between buildings. Accordingly, very noisy communications may result where only one channel estimate is used for all the paths in the trellis.

The overall performance of the system may be greatly improved by utilizing many different channel estimations for each of the individual trellis paths in the Viterbi algorithm or in a sub-optimal Viterbi algorithm. In this manner it is possible to calculate the Viterbi algorithm or its sub-optimal algorithm based on many channel estimations. The Viterbi algorithm has a specific number of states that depend upon factors such as the channel impulse response and the length of the memory in the channel. For example, if you are transmitting information utilizing a binary coding scheme, the specific number of states are two to the power of the length of the channel impulse response minus 1. For instance, if the length of the channel impulse response is 10 and a binary coding scheme is utilized, then the number of different states in the conventional Viterbi algorithm (one channel estimate per path) equals $2^9$ or 512 different states.

However, it is possible to use a plurality of different channel impulse response estimations for all the different trellis paths. Obviously, the number of calculations for each of the states in the Viterbi algorithm increase. In embodiments which utilize per-survivor processing (PSP), it is desirable to perform a best channel estimation based on the survivor path for the various channels in each path. The channel estimation based on the survivor path (minimum total metric in each path) is typically chosen using one of several well known techniques for best channel estimation. For example, one technique for performing the best channel estimation is the least mean square algorithm (LMS algorithm). Other algorithms such as recursive least squares (RLS) may also be utilized for performing the best channel estimation.

The variable step size factor approach of the present invention is applicable to each of these algorithms used to choose the best channel estimation. In preferred embodiments, a step size in the LMS algorithm or the weighting factor for RLS algorithm (collectively referred to as step size factor) is dynamically varied. The utilization of a separate adaptive step sizes or weighting factors for a plurality of survivor paths based on the estimated data sequence corresponding to that path provides significant overall performance improvements for the receiver in a mobile wireless environment.

Although the variable step size factor may be applied to a mobile transceiver in any number of ways, an exemplary embodiment is shown in FIG. 1. Referring to FIG. 1, encoder 1 inputs digital data bits and outputs a binary or a M-ary waveform of symbols $a_n$ to a communications channel h(t) 2. Additive noise is present in the system and is shown in the block diagram as n(t). The received signal on the other side of the communications channel h(t) is represented as r(t). In a receiver, the received signal r(t) is multiplied by multiplier 3 with a signal from phase estimator 7. Phase estimator 7 may be variously configured but is typically a phase locked loop which is configured to correct any phase errors in the received signal. The receiver typically includes a filtering arrangement such as whiting match filter 4 coupled to whiting match filter estimator 8. The filter is typically used to change color noise into white noise to match the receive signal so that the maximum signal-to-noise ratio may be achieved. Obviously, if the noise is white, the whitening match filter will be replaced by the match filter. A timing estimator 9 may be included to sample the received signals because the distance between the transmitter and receiver is random. The timing estimator 9 may be configured to determine the best time to sample the received signal such that the signal is sampled at least once per symbol. An adaptive decoder 6 may be configured as a programmed signal processor which implements either a Viterbi or a sub-optimal decoder with an adaptive step size factor. The adaptive channel impulse response (CIR) estimator is typically included within the adaptive decoder 6 and may utilize the same signal processor or other dedicated circuitry. With the exception of the adaptive decoder 6, the remainder of the receiver is conventional.

The adaptive decoder 6 provides a substantially improved equalizer system which is suitable for mobile wireless communications. In one embodiment, the adaptive decoder 6 is based on the Viterbi Algorithm (VA). In order to describe this technique in detail, it is helpful to examine Maximum Likelihood Sequence Estimation (MLSE) utilizing the VA.

The data symbol $a_k$ is a discrete, complex M-ary signal transmitted over a complex linear channel represented as h(t). The channel impulse response h(t) may represent the cascade of the transmitted filter and the physical channel. The complex received signal represented as r(t) may be approximated as $$r(t) = \sum_{n=-\infty}^{\infty} a_n h(t - nT_s) + n(t) \quad (1)$$

where n(t) is a complex additive Gaussian noise and independent of the transmitted data sequence. In practice, it may be helpful to assume a truncated channel impulse response which is nonzero just for the L symbol period. In this regard, L may be chosen so that most of the power of the channel impulse response (CIR) is in that interval.

$$\frac{\int_0^L h^2(t)dt}{\int_{-\infty}^{\infty} h^2(t)dt} \approx 1 \quad (2)$$

Based on the above assumption, (1) can be written as $$r(t) = \sum_{n=0}^{L} a_n h(t - nT_s) + n(t) \quad (3)$$

Here it may be assumed that the CIR is causal. If the CIR (h(t)) is known, the optimum receiver is composed of a match filter (the receiver filter is matched to the h(t)) and a sampler with the rate of the symbol period ($T_s$) followed by an adaptive decoder based on the Viterbi algorithm. The adaptive decoder searches for the best path with the minimum metric reaching each state in a trellis diagram. When the truncated CIR is a finite impulse response (FIR) filter with length L+1, the trellis in the VA typically has a finite number of states, i.e., $M^L$ states. In general, some of the parameters of the channel are unknown. Therefore, it may be desirable to select a joint data and channel estimation for use in the adaptive decoder such as the adaptive VA-based approach.

The trellis diagram in a MLSE receiver with a state $\mu_n$ may be defined as $$\mu_n = (\eta_n, a_{n-1}, a_{n-2}, \ldots, a_{n-L}) \quad (4)$$

where $\eta_n$ is the state's status at epoch n and L-tuple ($a_{n-1}$, $a_{n-2}$, ..., $a_{n-L}$) determines the state of the system at time n. The transition from $\mu_n$ to $\mu_{n+1}$ is shown as $\lambda(\mu_n \to \mu_{n+1})$. If $\omega_n$ is defined as the set of unknown parameters including the channel impulse response at time n (Obviously, $\omega_n$ can be time-variant parameter), then $$\lambda(\mu_n \to \mu_{n+1}) = F_{VA}[\mu_n \to \mu_{n+1}, r(t), \omega_n] \quad (5)$$

where $F_{VA}[\circ]$ represents the function that transfers the state of the system at time n, i.e., $\mu_n$, to time n+1, i.e., $\mu_{n+1}$, based on the received signal r(t) and the estimated unknown parameters $\omega_n$ at time n, i.e., $\hat{\omega}_n$. $\hat{\omega}_n$ can be the estimated channel impulse response ($\hat{h}(t)$) and other unknown parameters. Since the transmitted data as well as the CIR are unknown, both can be estimated simultaneously. For this reason, $\omega_n$ may be estimated based on the previous estimated data symbols. The estimated data symbols may be obtained from tentative decision at the Viterbi decoder output. A delay (D) is typically associated with the estimated data symbols. Accordingly, the estimated channel parameters, $\hat{\omega}_n$, may be based on all the data symbols prior to time (n−D). The relationship can be expressed as $$\hat{\omega}_n = F_{h(t)}[r(t), \{\hat{a}_j\}_{j=-\infty}^{n-D}] \quad (6)$$

The delay D is usually chosen approximately (5–7)×L in conventional MLSE. $F_{h(t)}[\circ]$ denotes the function that estimates $\omega_n$ based on the received signal r(t) and the estimated data symbols prior to time n−D $\{\hat{a}_j\}_{j=-\infty}^{n-D}$. In the situation that $\omega_n$ is unknown, the estimated unknown parameters, $\hat{\omega}_n$, is utilized from (6) to calculate the transition from $\mu_n$ to $\mu_{n+1}$ based on (5). This can be shown as $$\lambda(\mu_n \to \mu_{n+1}) = F_{VA}(\mu_n \to \mu_{n+1}, r(t), \hat{\omega}_n) \quad (7)$$

The total path metric at time n+1, i.e., $\Gamma(\mu_{n+1})$, can then be obtained based on the accumulated metrics at time n, i.e., $\Gamma(\mu_n)$, and the transition from $\mu_n$ to $\mu_{n+1}$. The survivor path may then be the one that has the minimum total metric.

$$\Gamma(\mu_{n+1}) = \min_{\mu_n \to \mu_{n+1}} \{\Gamma(\mu_n) + \lambda(\mu_n \to \mu_{n+1})\} \qquad (8)$$

Notice that in conventional MLSE, there is typically a delay D associated with the estimated $\hat{\omega}_n$ in (7). For systems that the CIR is varying with time rapidly compared to the delay D, MLSE will have a poor performance.

When the channel impulse response and other parameters needed in calculation of the metrics are unknown and varying with time rapidly, the conventional MLSE will not perform well. In the conventional MLSE, there is typically a delay D in estimation of the unknown parameters. This condition is not appropriate for time varying systems.

Per-Survivor Processing (PSP) is a MLSE-based technique that estimates the unknown parameters for each path in the VA based on the estimated data sequence in that path. In this regard, the unknown parameters may be updated every symbol period such that there is no delay in estimation of the unknown parameters. Since the correct value for the parameters may be unknown when the trellis is started, data-based estimation of the unknown parameters for each survivor path will provide more accurate result in a time-varying environment than the conventional MLSE. Equation (6) for a PSP-based approach will be $$\hat{\omega}_n(\mu_n) = F_{h(t)}[r(t), \{\hat{a}_j(\mu_n)\}_{j=-\infty}^{n-1}] \qquad (9)$$

These survivor estimates may then be used in the computation of the branch metrics.

$$\lambda(\mu_n \to \mu_{n+1}) = F_{VA}(\mu_n \to \mu_{n+1}, r(t), \hat{\omega}_n(\mu_n)) \qquad (10)$$

If the channel estimation is based on LMS algorithm, channel estimation and update will be as follows. An (L+1)-element vector for the channel impulse response may be defined as $$\underline{h}(\mu_n) = [\hat{h}_0(n), \hat{h}_1(n), \ldots, \hat{h}_L(n)]^t \qquad (11)$$

The data vector may be defined as $$\underline{a}(\mu_n \to \mu_{n+1}) = [\hat{a}_n(\mu_n \to \mu_{n+1}),$$

$$\hat{a}_{n-1}(\mu_n \to \mu_{n+1}), \ldots, \hat{a}_{n-L}(\mu_n \to \mu_{n+1})]^t \qquad (12)$$

The error for each path may be computed as $$e(\mu_n \to \mu_{n+1}) = r(t=nT_s) - \underline{h}(\mu_n)^t \times \underline{a}(\mu_n \to \mu_{n+1}) \qquad (13)$$

The channel may be updated at each symbol period for all the survivor path as $$\underline{h}(\mu_{n+1}) = \underline{h}(\mu_n) + \beta e(\mu_n \to \mu_{n+1}) \underline{a}^*(\mu_n \to \mu_{n+1}) \qquad (14)$$

where * represents complex transpose of a matrix. In this regard, the LMS algorithm may be applied for each individual path based on the estimated data sequence associated to that path.

Aspects of the present invention are concerned with making the PSP algorithm of (14) adaptive for a mobile environment. If we look at (14), the step size factor used in the LMS algorithm for all the survivor paths is the same. In practice, a value that is suitable for a particular application is typically chosen based on experience. If we decide to use any adaptive variable step size algorithm for the LMS algorithm, then we can choose a value for the step size factor for each path based on the estimated data sequence related to the survivor path. This will essentially break and separate all possible dependencies between different paths to estimate the CIR and for a fast time-varying system this can improve the performance considerably. Accordingly, this modification of the PSP will greatly improve the performance of the system in terms of symbol error rate probability. In this regard, (14) may be written as $$\underline{h}(\mu_{n+1}) = \underline{h}(\mu_n) + \beta(\mu_n \to \mu_{n+1}) e(\mu_n \to \mu_{n+1}) \underline{a}^*(\mu_n \to \mu_{n+1}) \qquad (15)$$

Equation (15) represents one solution to the adaptive decoder for use in mobile communication systems. Notice that this technique is not limited only to the LMS algorithms/receivers. The technique may similarly be applied to a RLS algorithm/receiver by choosing adaptive RLS algorithm and select the weighting factor dependent on each survivor path. Therefore, in general, techniques that utilize the estimated data sequence for channel estimation utilizing LMS or RLS algorithms adaptively, can use this approach in a PSP-based receiver.

Referring to Equation 14, conventionally, the same step size is used for each path. For example, conventionally a step size of 0.01 is used for all of the different paths. I propose variable step size factor for each of the different paths depend on the sequence of the data that exists on that path. Accordingly, an improvement in the algorithm results from choosing a different step size factor for each path. Accordingly, the modified Viterbi algorithm utilizes a step size factor which varies dependant upon the path. For example, in equation 15, the step size factor is represented by the term $\mu_n$ to $\mu_{n+1}$. When you progress from $\mu_n$ to $\mu_{n+1}$ typically, the step size factor does not vary between only two numbers but depends on a particular path with $\mu_n$ representing a particular path. As you progress from state $\mu$ at time n to state $\mu$ at time n+1, this corresponds to a path and represents the history of the data sequence as a function of the path.

Aspects of my invention relate to the use of an adaptive step size factor as applied to the Per Survivor Processing in the Viterbi algorithm or in a sub-optimal Viterbi algorithm. One embodiment of this invention may be shown by comparing equations 14 and 15. In equation 14, the step size factor is generally fixed. However, in equation 15 the step size factor dynamically varies based on the memory of the system (i.e., the path). Where the memory of the system is different, the beta varies. Embodiments of the invention adaptively estimate the channel for each path for each data sequence in, for example, the trellis in the Viterbi algorithm. Further, embodiments of the invention utilize an independent step size factor to make the system more accurate and reduce the dependency between different data sequence paths. In further aspects of the present invention, a variable step size factor is utilized to perform the individual channel estimates. In these embodiments, the step size factor may vary dependent upon the estimated beta sequence related to that path.

Accordingly, an adaptive receiver may implement a Viterbi algorithm which utilizes many channels estimations based on different paths (e.g., based on different histories of the estimated data sequence related to the survivor paths.) In a binary case, the Viterbi algorithm has $2^{(L-1)}$ states, each one corresponding to a path. For each individual path, one embodiment of the present invention applies an adaptive RLS algorithm or variable step size LMS algorithm. Where a RLS algorithm is utilized, it may be desirable to varying the weighting factor in the same manner as the step size factor is varied above. In other words, in the similar manner as taught herein, you can estimate adaptively the waiting factor in the RLS algorithm. In the RLS embodiment, channel estimations are configured to use RLS algorithm instead of using an LMS algorithm.

Although the adaptive step size factor outlined above is described primarily with Viterbi algorithms, a similar approach may be used with sub-optimal algorithms such as Reduced State Sequence Estimation (RSSE) and Delay Decision Frequency Sequence Estimation (DDFSE). In these cases, the number of states in these algorithms are less than the Viterbi Algorithm. However, it is desirable to still choose different channel estimates for all these reduced state algorithms based on the variable step size LMS algorithm or variable weighting factor RLS algorithm.

The use of a variable step size factor is particularly useful for mobile phones and other transceivers located in cars which are moving relatively fast. In this environment, the variations of the channel is so fast that by utilizing a variable step-size factor the system becomes more adaptive and the channel estimation will provide a more accurate estimation of the data. Further, the use of a variable step size allows each path to be independent of every other path. For example, as a car containing a mobile transceiver goes under a bridge, the channel is changing rapidly with time. By utilizing adaptive per-survivor processing, the overall system performance is greatly improved.

While exemplary receivers and methods embodying the present invention are shown by way of example, it will be understood, of course, that the invention is not limited to these embodiments. Modifications may be made by those skilled in the art, particularly in light of the foregoing teachings. For example, the embodiment of FIG. 1 may combine any suitable receiver with the adaptive step-size or weighting factor. Additionally, each of the elements of the aforementioned embodiments may be utilized alone or in combination with elements of the other embodiments. Further, although the dynamic step size factor has been described in terms of a mobile transceiver, it is also applicable to a stationary transceiver.

What is claimed is:

1. A method comprising decoding received M-ary modulated digital data symbols using: a different variable step size factor for an LMS algorithm or, using a different variable weighting factor for an RLS algorithm, for each path of a plurality of survivor paths in a Viterbi or sub-optimal algorithm.

2. The method of claim 1 wherein the M-ary modulated digital data symbols are received from a mobile communications system.

3. The method of claim 1 wherein the variable step size factor is dynamically determined in response to an estimated channel impulse response.

4. The method of claim 1 wherein the survivor paths are within the full trellis in the Viterbi algorithm.

5. The method of claim 1 wherein the survivor paths are utilized in a sub-optimal Viterbi algorithm.

6. The method of claim 1 wherein the sub-optimal algorithm is utilized.

7. The method of claim 6 wherein the sub-optimal algorithm is a Reduced State Sequence Estimation (RSSE) algorithm.

8. The method of claim 6 wherein the sub-optimal algorithm is a Delay Decision Frequency Sequence (DDFS) algorithm.

9. The method of claim 1 wherein the decoding occurs in a maximum likelihood sequence estimation (MLSE) based decoder.

10. The method of claim 1 wherein decoding received M-ary modulated digital data symbols includes receiving the M-ary modulated digital data symbols from a wireless communications system having memory.

11. The method of claim 10 wherein the wireless communications system has inter symbol interference.

12. A method for recovering transmitted data symbols comprising:

receiving a signal having M-ary modulated data symbols from a wireless communications system from an environment having inter symbol interference;

decoding the signal using a Viterbi decoder or a sub-optimal decoder which includes a different variable step size factor for an LMS algorithm or a different variable weighting factor for an RLS algorithm, for each survivor path for a plurality of survivor paths.

13. The method of claim 1 wherein the variable step size factor is used for each survivor path in a Viterbi or its sub-optimal algorithm.

14. The method of claim 13 wherein the survivor paths are the complete trellis in the Viterbi algorithm using per survivor processing.

15. The method of claim 13 wherein the survivor paths are utilized in a sub-optimal algorithm.

16. The method of claim 15 wherein the sub-optimal algorithm is a Reduced State Sequence Estimation (RSSE) algorithm.

17. The method of claim 15 wherein the sub-optimal algorithm is a Delay Decision Frequency Sequence (DDFS) algorithm.

18. The method of claim 1 wherein the M-ary modulated digital data symbols are received from a mobile communications system having memory.

19. A method comprising:

receiving a plurality of M-ary modulated digital data symbols; and using a different variable step size factor, for each path of a plurality of survivor paths in a Viterbi or sub-optimal algorithm to reduce noise in mobile communications.

20. A mobile communication system comprising a plurality of receivers for receiving M-ary modulated digital data symbols, each receiver including an adaptive decoder configured to decode the M-ary modulated digital data symbols using a different variable step size factor for an LMS algorithm or a different variable weighting factor for an RLS algorithm, for each path a plurality of survivor paths in a Viterbi or sub-optimal algorithm.

21. The apparatus of claim 20 wherein decoder includes circuits for dynamically determining the variable step size factor in response to an estimated channel impulse response.

22. The apparatus of claim 20 wherein the variable step size factor is used for each survivor path.

23. The apparatus of claim 20 wherein the survivor paths comprise the complete trellis in the Viterbi algorithm.

24. An apparatus comprising a receiver configured to receive a signal having M-ary modulated digital data symbols from a wireless communications system with inter symbol interference and including a decoder including a signal processor for implementing a Viterbi decoder or a sub-optimal decoder which includes a different variable step size factor for an LMS algorithm or a different variable weighting factor for an RLS algorithm, for each survivor path of a plurality of survivor paths.

25. The receiver of claim 24 wherein the variable step size factor is used for each survivor path in a Viterbi or sub-optimal algorithm.

26. The receiver of claim 24 wherein the survivor paths are the complete trellis in the Viterbi algorithm.

27. The method of claim 1 wherein the survivor paths are utilized in a sub-optimal algorithm.

28. An apparatus comprising a receiver including a decoding means for decoding a plurality of received M-ary modulated digital data symbols using a different variable step size factor for an LMS algorithm or using a different variable weighting factor for an RLS algorithm, for each survivor path of a plurality of survivor paths to improve performance in mobile communications.

* * * * *